United States Patent
Allen et al.

(10) Patent No.: US 9,754,504 B2
(45) Date of Patent: Sep. 5, 2017

(54) GENERATING MULTIPLE CHOICE QUESTIONS AND ANSWERS BASED ON DOCUMENT TEXT

(71) Applicant: International Business Machines Corporation, Armonk, NY (US)

(72) Inventors: Corville O. Allen, Morrisville, NC (US); Roberto DeLima, Apex, NC (US); Andrew R. Freed, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 12 days.

(21) Appl. No.: 14/967,492

(22) Filed: Dec. 14, 2015

(65) Prior Publication Data

US 2017/0169717 A1    Jun. 15, 2017

(51) Int. Cl.
| | |
|---|---|
| G09B 7/06 | (2006.01) |
| G09B 7/08 | (2006.01) |
| G09B 19/00 | (2006.01) |
| G06F 17/27 | (2006.01) |
| G09B 7/12 | (2006.01) |

(52) U.S. Cl.
CPC ............... *G09B 7/06* (2013.01); *G06F 17/27* (2013.01); *G09B 7/08* (2013.01); *G09B 7/12* (2013.01); *G09B 19/00* (2013.01)

(58) Field of Classification Search
USPC ........................................................ 434/322
See application file for complete search history.

(56) References Cited

U.S. PATENT DOCUMENTS

| | | |
|---|---|---|
| 6,688,889 B2 | 2/2004 | Wallace et al. |
| 7,483,670 B2 | 1/2009 | Walker et al. |

(Continued)

FOREIGN PATENT DOCUMENTS

WO    2009042555    4/2009

OTHER PUBLICATIONS

Mitkov et al., "A Computer-Aided Environment for Generating Multiple-Choice Test Items," Natural Language Engineering, vol. 12, ISSN—13513249, Cambridge University Press, Jun. 2006, pp. 177-194.

(Continued)

*Primary Examiner* — James Hull
(74) *Attorney, Agent, or Firm* — Van Leeuwen & Van Leeuwen; Diana R. Gerhardt

(57) ABSTRACT

An approach is provided that improves a question answering (QA) computer system by ingesting a set of documents into a corpus of a first QA system. A multiple choice test is generated from the set of documents. The multiple choice test includes any number of questions, with each of the questions having a correct answer and one or more candidate, or wrong answers. The questions and answers are retrieved from the set of documents. The approach identifies concepts that correspond to each of the questions. The candidate answers corresponding to each of the questions are generated based on the identified concepts that pertaining to the respective questions. In this manner, the candidate answers are designed to be misleading in light of the respective questions. A subject, such as a second QA system, is tested using the generated multiple choice test.

17 Claims, 9 Drawing Sheets

(56) References Cited

U.S. PATENT DOCUMENTS

| | | |
|---|---|---|
| 2010/0273138 A1 | 10/2010 | Edmonds et al. |
| 2011/0045452 A1 | 2/2011 | Bejar et al. |
| 2011/0125734 A1 | 5/2011 | Duboue et al. |
| 2011/0257961 A1* | 10/2011 | Tinkler .................. G09B 19/04 704/9 |

OTHER PUBLICATIONS

Papasalouros et al., "Automatic Generation of Multiple Choice Questions from Domain Ontologies," MCCSIS'08—IADIS Multi Conference on Computer Science and Information Systems, Proceedings of e-Learning 2008, vol. 1, ISBN—9789728924584, IADIS, Rua Sao Sebastiao da Pedreira 100, Lisbon, 3 1050-209, Portugal, pp. 427-434.

* cited by examiner

GENERATING MULTIPLE CHOICE QUESTIONS AND ANSWERS BASED ON DOCUMENT TEXT

BACKGROUND

A Question Answering (QA) system is a computer system that utilizes natural language processing (NLP) to answer questions posed in a natural language. A QA implementation, usually a computer program, may construct its answers by querying a structured database of knowledge or information, usually a knowledge base, or "corpus." QA systems can retrieve, or ingest, information from an unstructured collection of natural language documents. Some examples of natural language document collections used for QA systems include a local collection of reference texts, an internal organization documents and web pages, a compiled newswire reports, and a set of online web pages.

QA research attempts to deal with a wide range of question types including: fact, list, definition, how, why, hypothetical, semantically constrained, and cross-lingual questions. Closed-domain question answering deals with questions under a specific domain (for example, medicine or automotive maintenance), and can be seen as an easier task because NLP systems can exploit domain-specific knowledge frequently formalized in ontologies. Alternatively, closed-domain might refer to a situation where only a limited type of questions are accepted, such as questions asking for descriptive rather than procedural information. On the other hand, open-domain question answering deals with questions about nearly anything, and can only rely on general ontologies and world knowledge. On the other hand, these systems usually have much more data available from which to extract the answer. A challenge facing researchers is how to test newly created or modified QA systems with the testing including not only whether the QA system answered a question correctly, but also whether the candidate answers the QA system was considering, while not correct answers, were reasonable candidates.

BRIEF SUMMARY

An approach is provided that improves a question answering (QA) computer system by ingesting a set of documents into a corpus of a first QA system. A multiple choice test is generated from the set of documents. The multiple choice test includes any number of questions, with each of the questions having a correct answer and one or more candidate, or wrong answers. The questions and answers are retrieved from the set of documents. The approach identifies concepts that correspond to each of the questions. The candidate answers corresponding to each of the questions are generated based on the identified concepts that pertaining to the respective questions. In this manner, the candidate answers are designed to be misleading in light of the respective questions. A subject, such as a second QA system, is tested using the generated multiple choice test.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
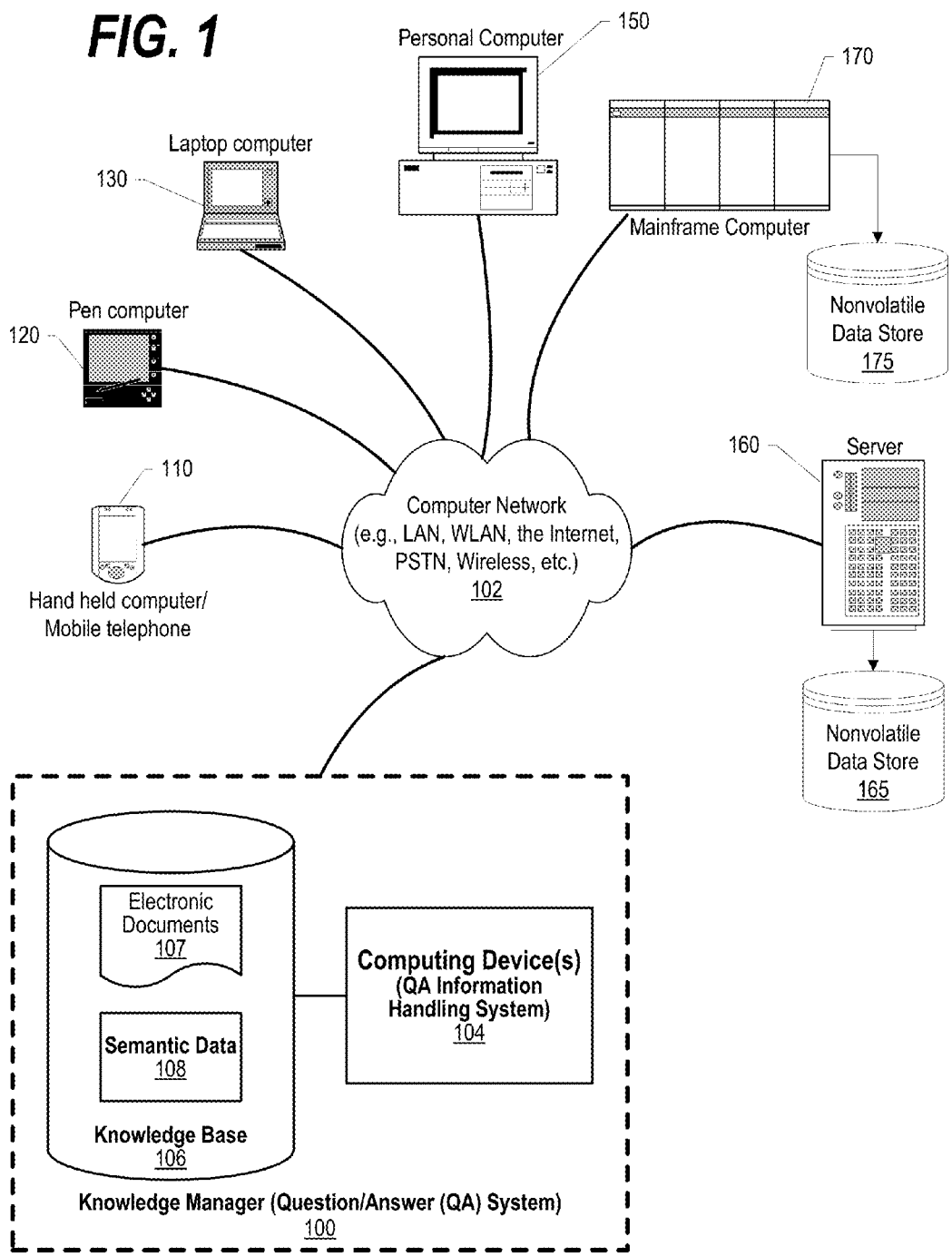
FIG. 1 depicts a schematic diagram of one illustrative embodiment of a question answering (QA) system in a computer network.

FIGS. 1-9 depict an approach that generates a multiple choice test from document text with the generated test including a correct answer and candidate (wrong) answers that were deemed to be candidates that could possibly mislead the test taker, such as another QA system that is being tested. The core idea of the approach is to analyze paragraphs and text to generate multiple choice questions, where there is a correct answer but also one or more closely related, but incorrect answers, from which to choose.

The approach pulls a set of question and answer pairs from documents, chooses a question, and identify the lexical answer type and the concepts that are within the sentence. The approach further finds similar concepts relevant to the domain from corpora or the same document. A set of optional substitution choices are created by utilizing the close entity relationship maps that are the same as the lead concept types, antonyms for the statements and similarity of characteristic of the entity or Lexical Answer Type (LAT). The approach substitutes choices utilizes the key concepts and LAT to give viable options that are close enough to test true knowledge.

In one embodiment, the multiple choice tests generated by the system are used to test the accuracy of other QA systems under development. The QA systems can be either open-domain systems or closed-domain systems. The correct answer from the multiple choice test can be used to test the correctness of the QA system under test, while the candidate (wrong) answers can be compared to the candidate answers of the QA system under test to uncover possible errors in the QA system under test in the selection or weighting of candidate answers. In addition, this approach could be used as a study guide for students, without the need for a teacher to pull this information out or find tests. This could help teachers create dynamic quizzes for each student where the multiple choice answers are random, not just randomly placed, and even the questions are random. By being able to quickly generate this from a section or set of paragraphs this could be incorporated in an e-reader to quickly test on a chapter by chapter.

The approach parses documents and generates question and answer pairs. From the question and answer pairs for each question and answer, the approach finds the key concepts and the lexical answer type (LAT). The lexical answer type drives the type of multiple choice answers available. The key concepts are used to scope the answer type to the same category or relationship of the concepts their entities and characteristics. From within the documents, the approach finds similar concepts with the same LAT, then extrapolates to the domain using additional corpora or more text that is proximate to the area selected for the question and answer pairs. Antonyms are identified based on the adjective or adverb or verb used in conjunction with the LAT, with such antonyms serving as candidate options. Similar entities within the text are found based on relationship and gender, or generalized more same type of relationship and characteristics. These similar entities are also used as the basis for the generated candidate answers.

Below are examples of multiple choice questions generated by the approach with reasoning provided for candidate (incorrect) answer choices:

1. Question: When did Barry Bonds break the home run record?
   (A) 2003 (correct answer)
   Multiple choice (wrong) candidates with reasoning:
   (B) 1998 (candidate—When did Mark McGuire break the home run record?)
   (C) 2009 (candidate—When did Barry Bonds retire?)
   (D) 1986 (candidate—When did Barry Bonds join major league baseball?)
2. Question: "When did World War II start?"
   (A) 1939 (correct answer) Key concepts: War, World War, World War II, start, dates. Lexical Answer type: Year
   Multiple choice (wrong) candidates with reasoning:
   (B) 1945 (from When did World War II end?)
   (C) 1941 (from When was the Pearl Harbor attack? when did U.S. enter war?)
   (D) 1935 (from When was the Abyssian War?)
   (E) 1914 (from When did World War I start?)
   (F) 1918 (from When did World War I end?)
   (G) 1944 (off by one)(When was the attack on Normandy) (many other 1944 references in WWII article)
   (H) 1946 (off by one)

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer (QA) system 100 in a computer network 102. QA system 100 may include knowledge manager 104, which comprises one or more processors and one or more memories, and potentially any other computing device elements generally known in the art including buses, storage devices, communication interfaces, and the like. Computer network 102 may include other computing devices in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments may include QA system 100 interacting with components, systems, sub-systems, and/or devices other than those depicted herein.

QA system 100 may receive inputs from various sources. For example, QA system 100 may receive input from the network 102, a corpus of electronic documents 107 or other data, semantic data 108, and other possible sources of input. In one embodiment, some or all of the inputs to QA system 100 route through the network 102 and stored in knowledge base 106. The various computing devices on the network 102 may include access points for content creators and content users. Some of the computing devices may include devices for a database storing the corpus of data. The network 102 may include local network connections and remote connections in various embodiments, such that QA system 100 may operate in environments of any size, including local and global, e.g., the Internet. Additionally, QA system 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, a content creator creates content in a document 107 for use as part of a corpus of data with QA system 100. The document 107 may include any file, text, article, or source of data for use in QA system 100. Content users may access QA system 100 via a network connection or an Internet connection to the network 102, and may input questions to QA system 100, which QA system 100 answers according to the content in the corpus of data. As further described below, when a process evaluates a given section of a document for semantic content, the process can use a variety of conventions to query it from knowledge manager 104. One convention is to send a well-formed question.

Semantic data 108 is content based on the relation between signifiers, such as words, phrases, signs, and symbols, and what they stand for, their denotation, or connotation. In other words, semantic data 108 is content that interprets an expression, such as by using Natural Language Processing (NLP). In one embodiment, the process sends well-formed questions (e.g., natural language questions, etc.) to QA system 100 and QA system 100 may interpret the question and provide a response that includes one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
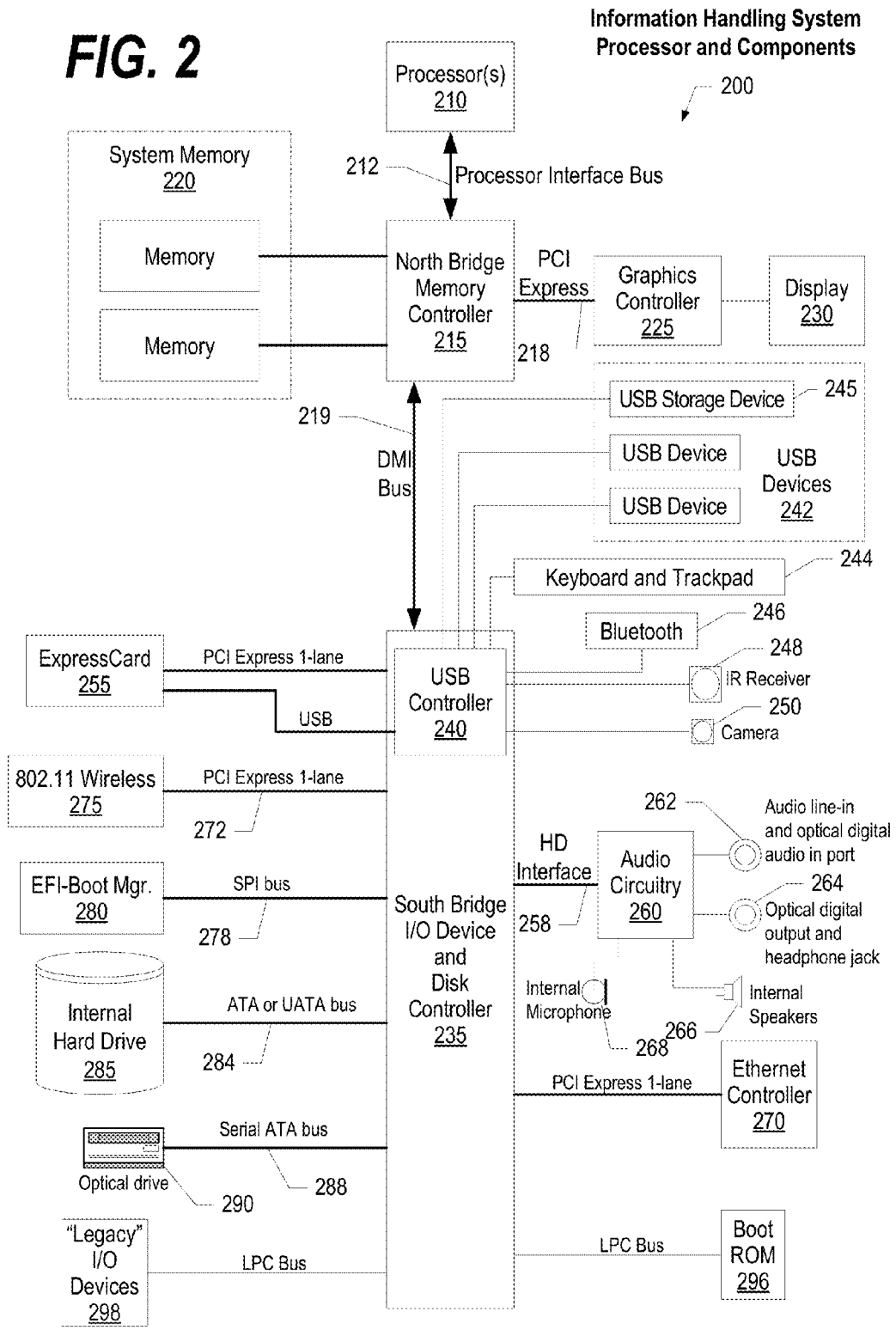
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, et cetera.

Wireless Local Area Network (LAN) device 275 connects to Southbridge 235 via the PCI or PCI Express bus 272. LAN device 275 typically implements one of the IEEE 802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
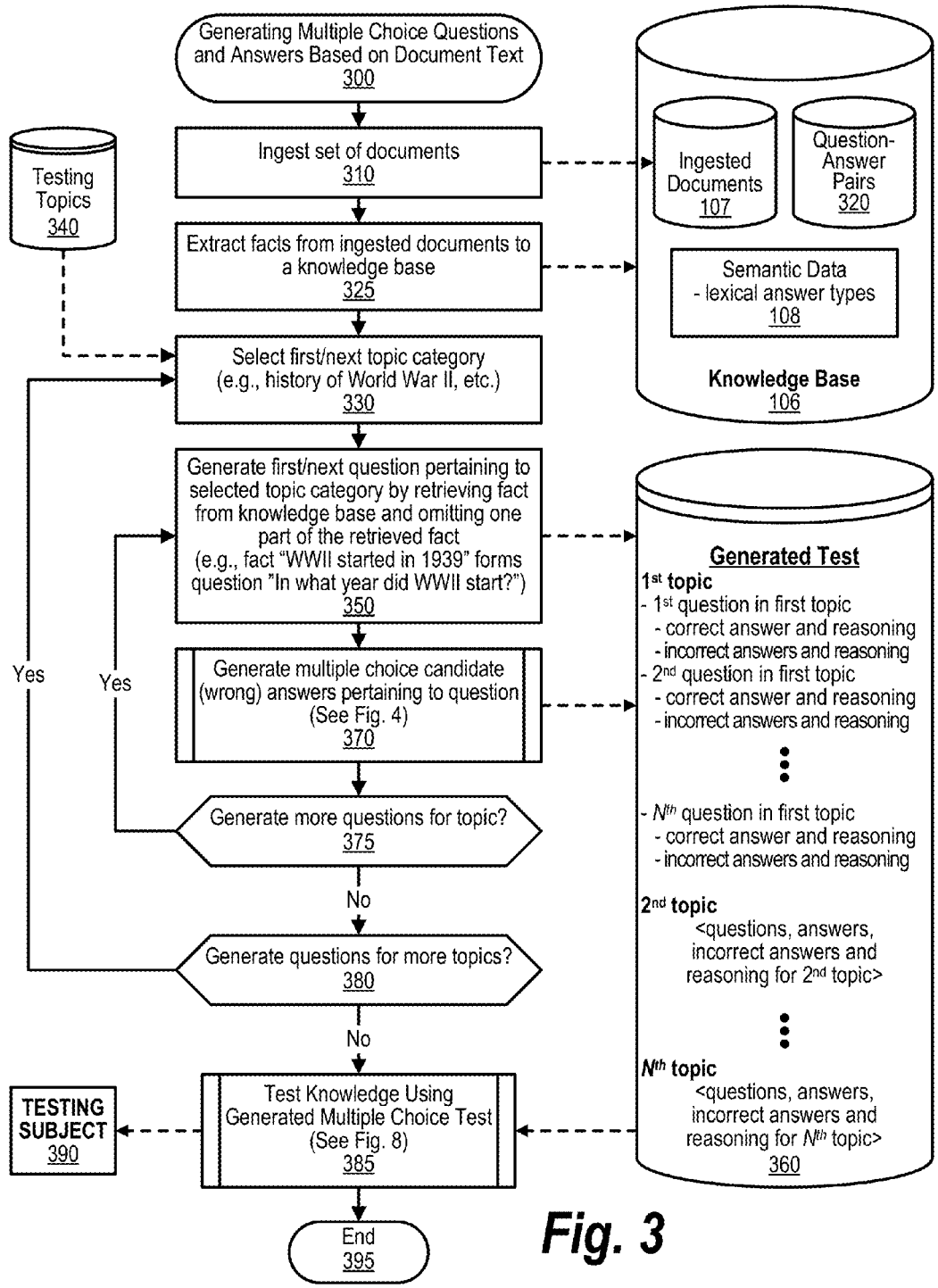
FIG. 3 is an exemplary high level flowchart that shows the overall steps used in generating multiple choice questions and answers based on document text in a question-answer (QA) system.

FIG. 3 is an exemplary high level flowchart that shows the overall steps used in generating multiple choice questions and answers based on document text in a question-answer (QA) system. FIG. 3 processing commences at 300 and shows the steps taken by a process that generates a multiple choice test based on document text ingested into a question answering (QA) system. At step 310, the process ingests a set of documents into knowledge base 106 (the corpus) of QA system 100. Corpus 106 includes ingested documents 107, semantic data 108, such as lexical answer types (LATs) pertaining to questions, and question-answer pairs 320. At step 325, the process extracts facts from the ingested documents to a knowledge base. The ingested facts form the basis of question-answer pairs stored in data store 320.

At step 330, the process selects the first topic category from data store 340. For example, if the subject being tested is World War II, then such topic would be retrieved from data store 340. At step 350, the process generates the first question pertaining to selected topic category by retrieving fact from knowledge base and omitting one part of the retrieved fact. For example, the fact "WWII started in 1939" could form the question "In what year did WWII start?" The generated questions, answers, and candidate answers are stored in data store 360. At predefined process 370, the process performs the Generate Multiple Choice Candidates (wrong) routine pertaining to the generated question (see FIG. 4 and corresponding text for processing details). As shown, the candidates are stored in data store 360 along with reasoning text as to why the candidate is a wrong answer.

The process determines as to whether to generate more questions for the topic (decision 375). If more questions are being generated for the topic, then decision 375 branches to the 'yes' branch which loops back to step 350 to generate the next question for the selected topic. This looping continues until no more questions are being generated for the topic, at which point decision 375 branches to the 'no' branch exiting the loop. The process determines whether to generate questions for additional topics included in data store 340 (decision 380). If more questions are being generated for other topics, then decision 380 branches to the 'yes' branch which loops back to step 330 to select the next topic from data store 340. This looping continues until there are no more topics that are being tested, at which point decision 380 branches to the 'no' branch exiting the loop.

Figure 8:
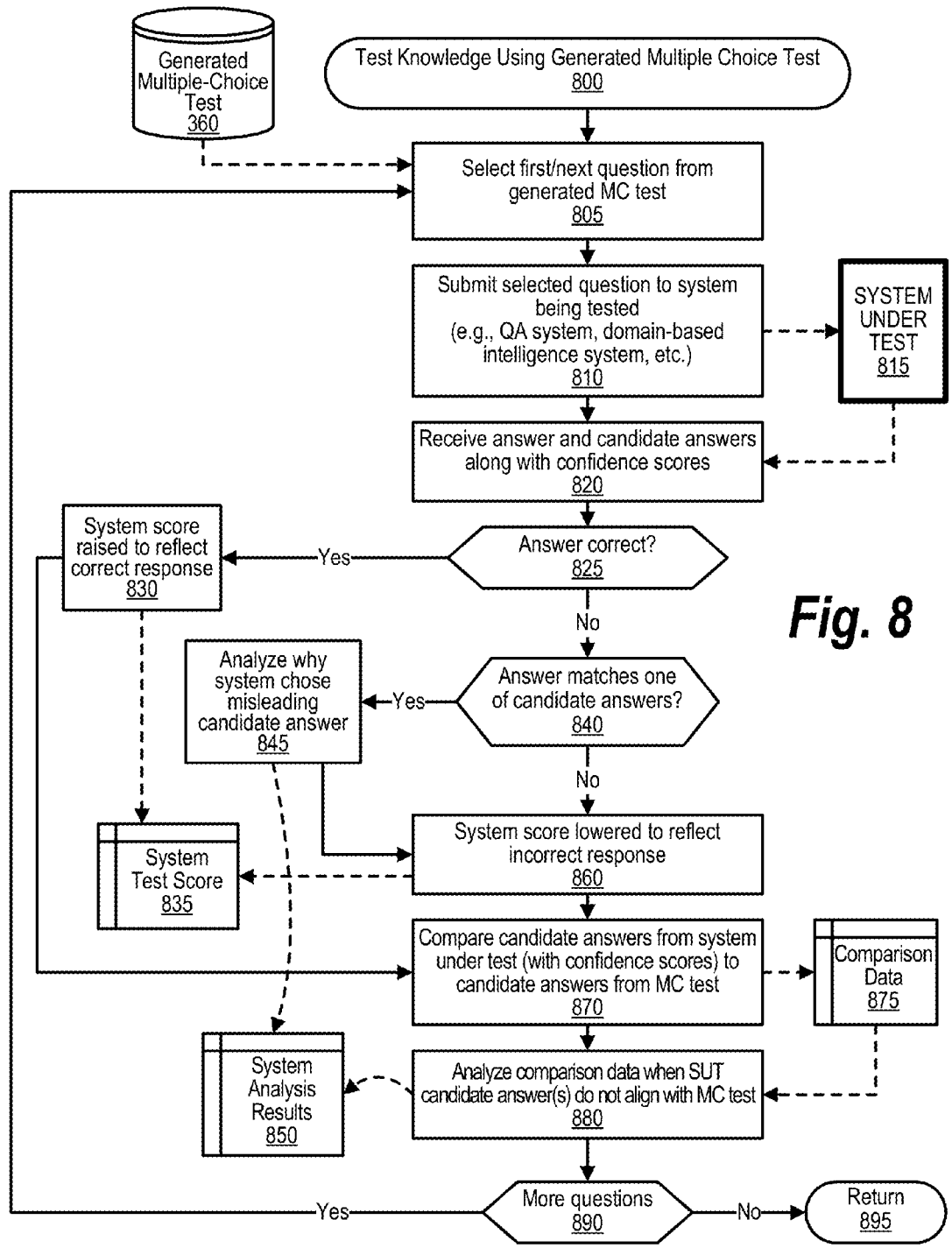
FIG. 8 is an exemplary flowchart that tests knowledge of a system using a generated multiple choice test.

At predefined process 385, the process performs the Test Knowledge Using Generated Multiple Choice Test routine (see FIG. 8 and corresponding text for processing details). In one embodiment, a second QA system 100 system is the testing subject 390, for example to test the accuracy and performance of a second QA system that is being developed. Analysis results from testing the subject, such as a QA system, can be used to improve the subject under test. FIG. 3 processing thereafter ends at 395.

Figure 4:
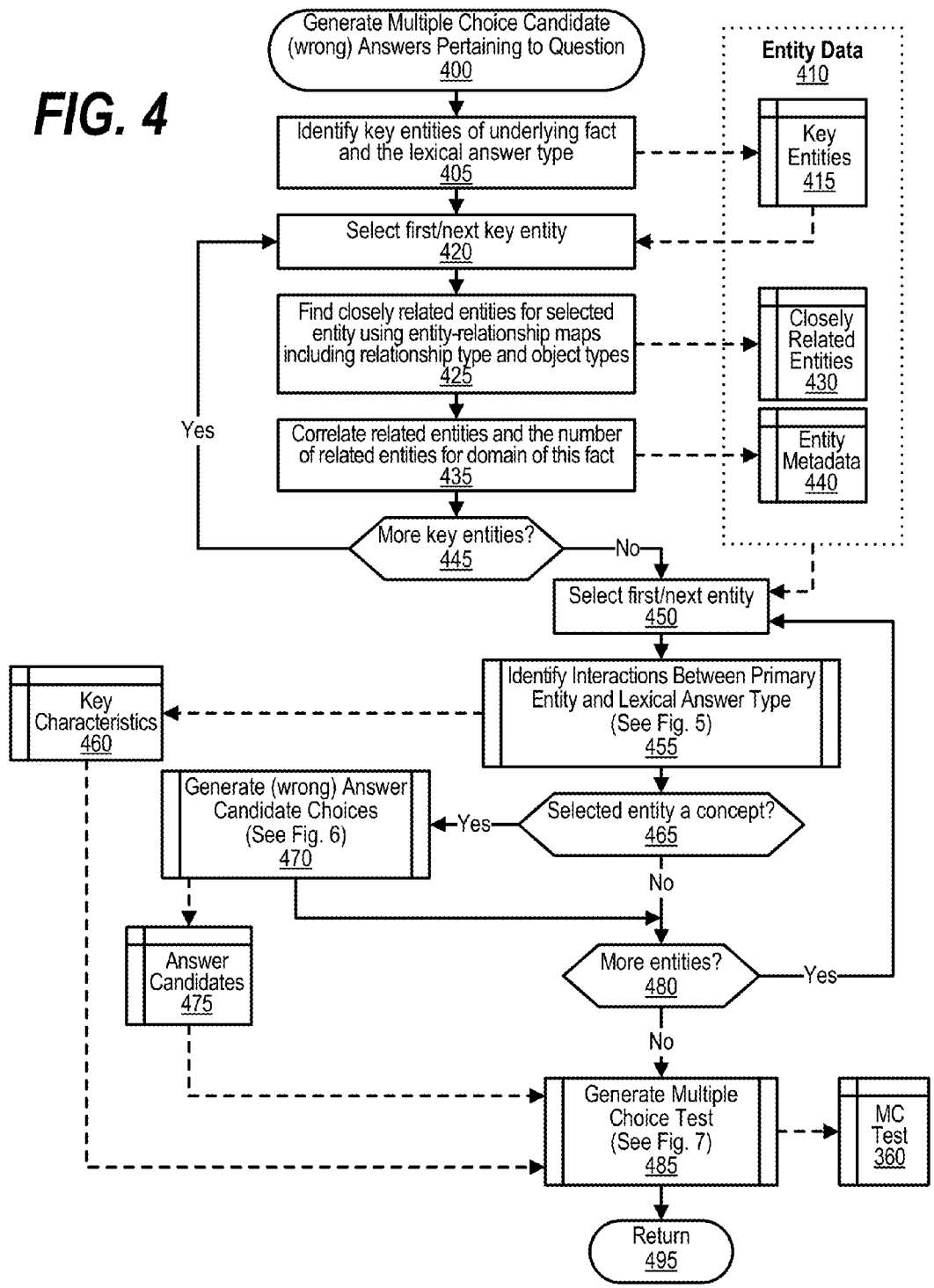
FIG. 4 is an exemplary flowchart that performs steps that generate multiple choice candidate (wrong) answers pertaining to a question.

FIG. 4 is an exemplary flowchart that performs steps that generate multiple choice candidate (wrong) answers pertaining to a question. FIG. 4 processing commences at 400 and shows the steps taken by a process that generates multiple choice candidate, or wrong, answers pertaining to a question. At step 405, the process identifies the key entities corresponding to the underlying fact that is the basis for the question and the lexical answer type (LAT) based on the question. Entity data is stored in memory area 410 with key entities being stored in memory area 415.

At step 420, the process selects the first key entity from memory area 415. At step 425, the process identifies closely related entities for the selected entity using entity-relationship maps that include relationship type and object types. The closely related entities are stored in memory area 430. At step 435, the process correlates related entities and the number of related entities for the domain pertaining to the underlying fact. The entity metadata is stored in memory area 440. The process determines as to whether there are more key entities to process from memory area 415 (decision 445). If there are more key entities to process, then decision 445 branches to the 'yes' branch which loops back to step 420 to select and process the next key entity. This looping continues until there are no more key entities to process, at which point decision 445 branches to the 'no' branch exiting the loop.

At step 450, the process selects the first entity from memory area 410. At predefined process 455, the process performs the Identify Interactions Between Primary Entity and Lexical Answer Type routine (see FIG. 5 and corresponding text for processing details). This routine results in a set of key characteristics that are stored in memory area 460. The process determines as to whether the selected entity is a concept (decision 465). If the selected entity is a concept, then decision 465 branches to the 'yes' branch to perform predefined process 470. On the other hand, if the selected entity is not a concept, then decision 465 branches to the 'no' branch bypassing predefined process 470. At predefined process 470, the process performs the Generate (wrong) Answer Candidate Choices routine (see FIG. 6 and corresponding text for processing details). Predefined process 470 stores the candidate answers in memory area 475. The process determines as to whether there are more entities in memory area 410 to process (decision 480). If there are more entities in memory area 410 to process, then decision 480 branches to the 'yes' branch which loops back to step 450 to select and process the next entity. This looping continues until there are no more entities in memory area 410 to process, at which point decision 480 branches to the 'no' branch exiting the loop.

Figure 7:
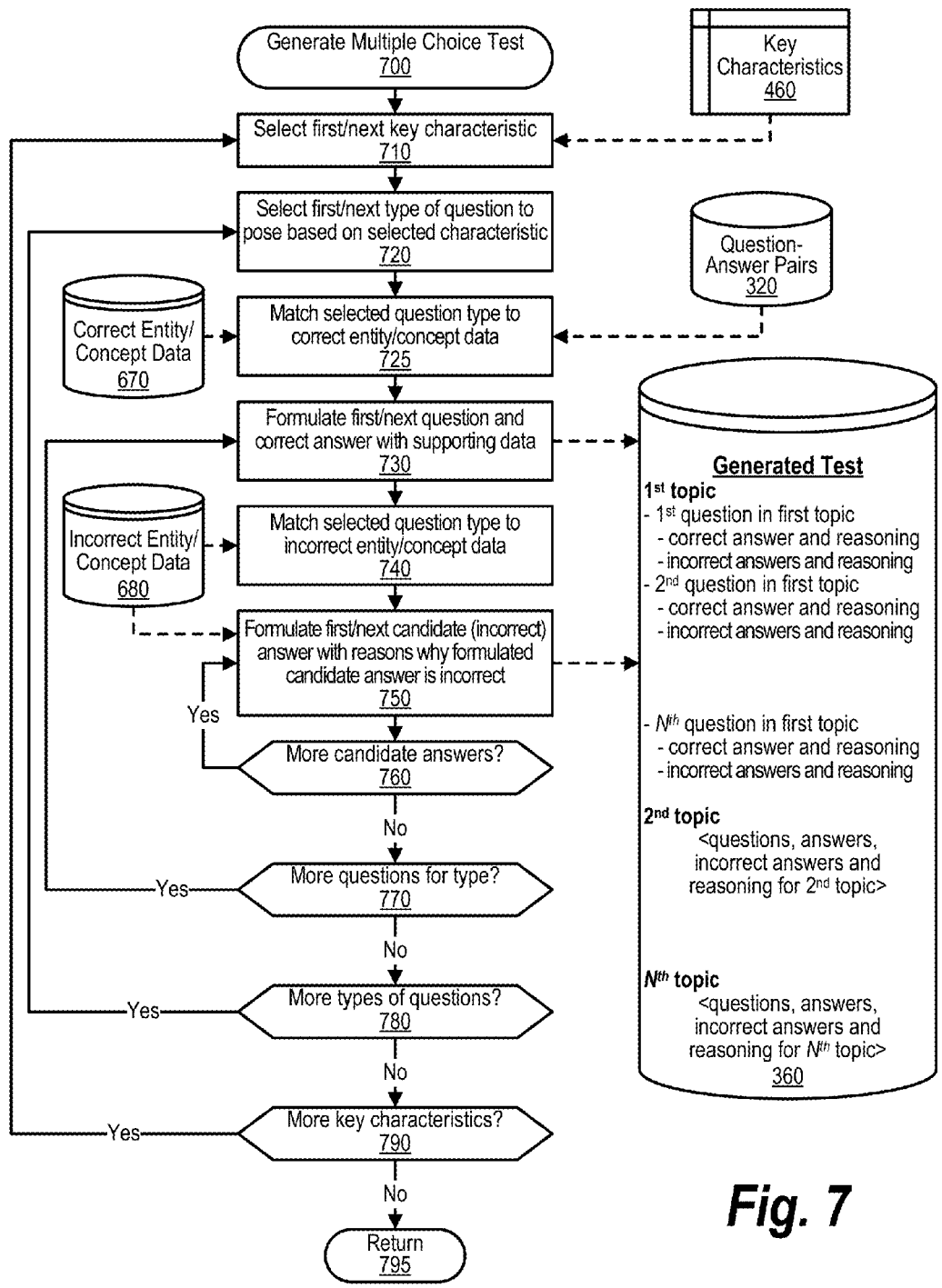
FIG. 7 is an exemplary flowchart that generates a multiple choice test.

At predefined process 485, the process performs the Generate Multiple Choice Test routine (see FIG. 7 and corresponding text for processing details). Predefined process 485 takes key characteristics from memory area 460 and answer candidates from memory area 475 as inputs and results in a multiple choice test that is stored in memory area 360. FIG. 4 processing thereafter returns to the calling routine (see FIG. 3) at 495.

Figure 5:
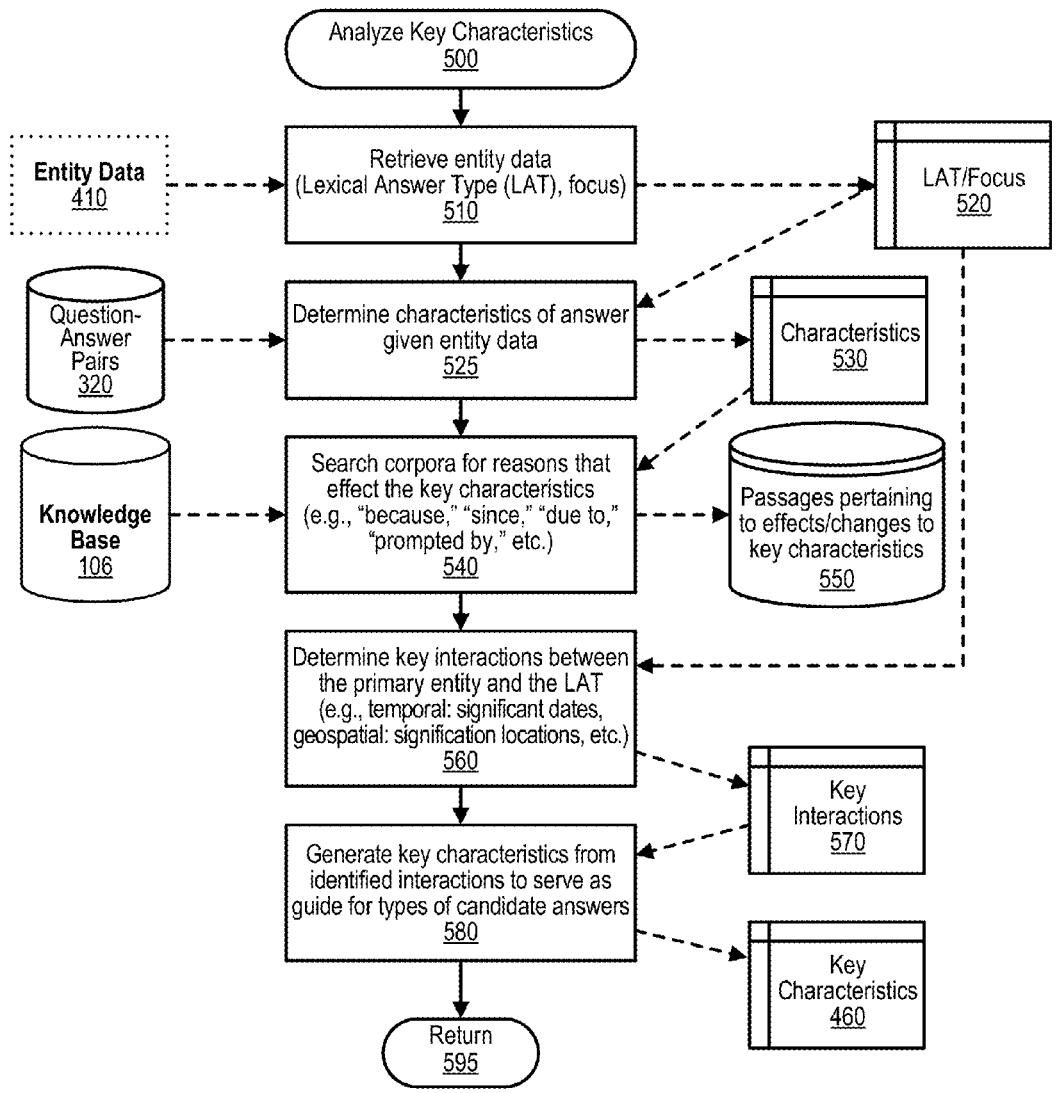
FIG. 5 is an exemplary flowchart that analyzes key characteristics pertaining to a multiple choice question.

FIG. 5 is an exemplary flowchart that analyzes key characteristics pertaining to a multiple choice question. FIG. 5 processing commences at 500 and shows the steps taken by a process that analyzes key characteristics pertaining to a question. At step 510, the process retrieves entity data from memory area 410. Entity data includes the Lexical Answer Type (LAT), and focus, of the entity. The LAT and focus are stored in memory area 520. At step 525, the process determines characteristics of the answer given the entity data retrieved from question-answer pairs stored in memory area 320. The characteristics that are identified are stored in memory area 530.

At step 540, the process searches corpora 106 for reasons that effect the key characteristics. For example, words such as "because," "since," "due to," "prompted by," etc. often signify reasons that effect the key characteristics. The reasons, in the form of passages, are stored in data store 550. At step 560, the process determines a set of key interactions found between the primary entity and the LAT. For example, the key interactions may be temporal (significant dates), geospatial (significant locations), etc. The LAT/focus are retrieved from memory area 520 and the determined key interactions are stored in memory area 570. At step 580, the process generates the set of key characteristics from the identified interactions stored in memory area 570. The key characteristics will serve as guide for the types of candidate answers being generated and are stored in memory area 460. FIG. 5 processing thereafter returns to the calling routine (see FIG. 4) at 595.

Figure 6:
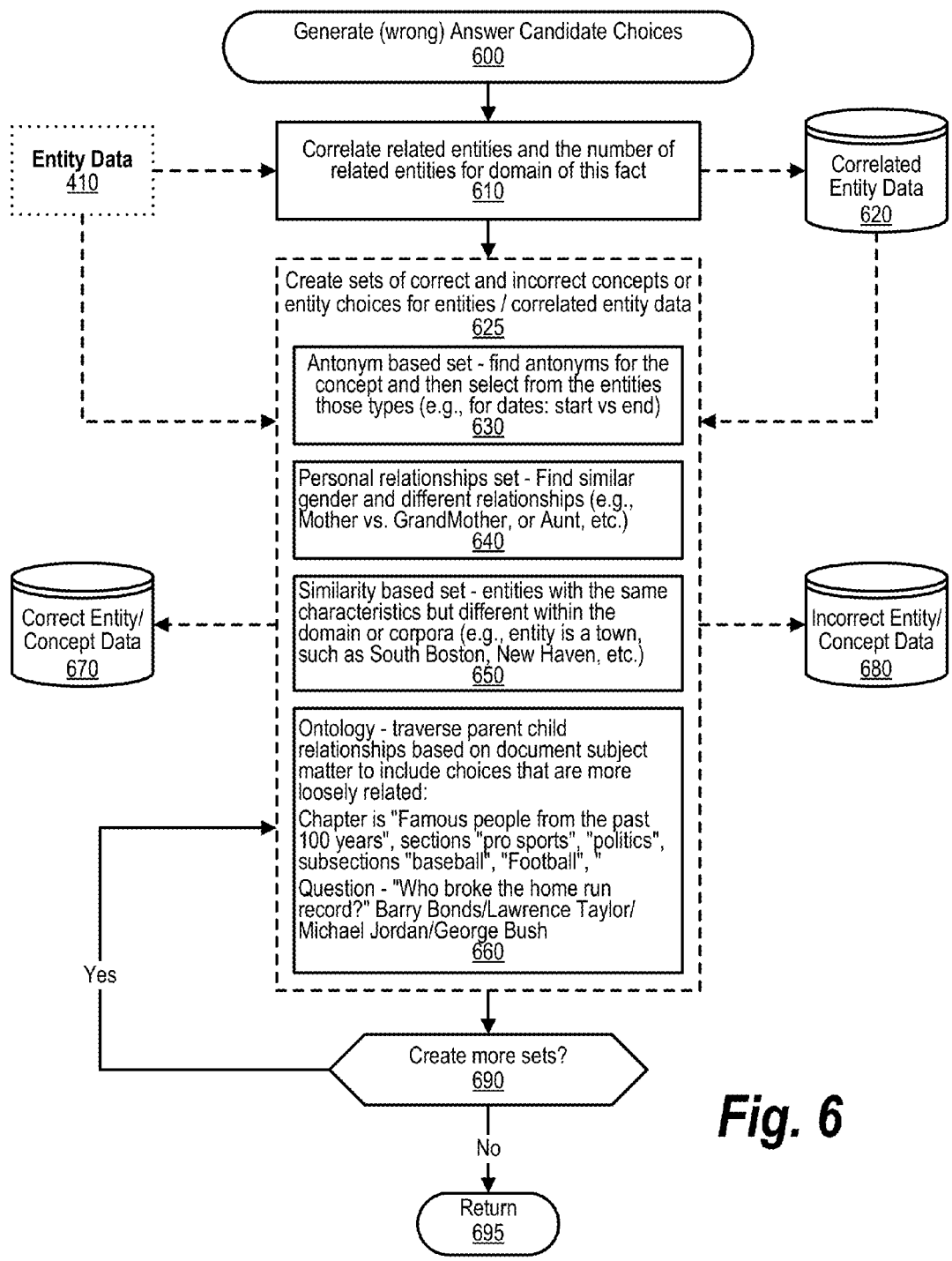
FIG. 6 is an exemplary flowchart that generates (wrong) answer candidate choices pertaining to a multiple choice question.

FIG. 6 is an exemplary flowchart that generates (wrong) answer candidate choices pertaining to a multiple choice question. FIG. 6 processing commences at 600 and shows the steps taken by a process that generates (wrong) candidate choices. At step 610, the process correlates related entities and the number of related entities for domain of this fact. The entity data is retrieved from memory area 410 and the resulting correlated entity data is stored in data store 620.

At step 625, the process creates sets of correct and incorrect concepts or entity choices for entities/correlated entity data. The sets of correct and incorrect concepts or entity choices are created using steps 630 through 660. The entity data is retrieved from memory area 410 and data store 620. Correct entity/concept data is stored in data store 670 with incorrect entity/concept data being stored in data store 680 At step 630, the process creates an antonym based set. This step finds antonyms for the concept and then selects from the entities those types that are antonyms (e.g., for dates: start vs. end). At step 640, the process creates an personal relationships set. This step finds similar gender and different relationships (e.g., Mother vs. Grand Mother, or Aunt, etc.). At step 650, the process creates an similarities based set. This step finds entities with the same characteristics but different within the domain or corpora (e.g., entity is a town, such as South Boston, New Haven, etc.). At step 660, the process creates an ontology based set. The process traverses the parent child relationships based on document subject matter to include choices that are more loosely related. For example, if a chapter is "Famous people from the past 100 years", with sections of "pro sports", "politics", and subsections of "baseball", "football", etc. a question of "Who broke the home run record?" might result in the following ontology "Barry Bonds/Lawrence Taylor/Michael Jordan/George Bush."

The process determines as to whether more sets of correct and incorrect concepts are being created (decision 690). If more sets are being created, then decision 690 branches to the 'yes' branch which loops back to step 625 to repeat the processing described above. This looping continues until no more sets are being created, at which point decision 690 branches to the 'no' branch exiting the loop. FIG. 6 processing thereafter returns to the calling routine (see FIG. 4) at 695.

FIG. 7 is an exemplary flowchart that generates a multiple choice test. FIG. 7 processing commences at 700 and shows the steps taken by a process that generates the multiple choice test. At step 710, the process selects the first key characteristic from memory area 460. At step 720, the process selects the first type of question to pose based on selected characteristic. At step 725, the process matches the selected question type to the correct entity/concept data and a question-answer pair that correspond to the selected answer type. The correct entity/concept data is retrieved from data store 670 and the question-answer pair is retrieved from data store 320.

At step 730, the process formulates the first question and the correct answer with supporting textual data. The formulated questions, correct answers, and supporting data are stored in data store 360. At step 740, the process matches the selected question type to incorrect entity/concept data that is retrieved from data store 680. At step 750, the process formulates the first candidate (incorrect) answer with reasons why the formulated candidate answer is incorrect. The candidate answer and the reasons why the candidate answer is incorrect are retrieved from data store 680. The process determines whether there are more candidate answers to be generated (decision 760). If more candidate answers are being generated for this question, then decision 760 branches to the 'yes' branch which loops back to step 750 to formulate the next candidate answer. This looping continues until no more candidate answers are being generated for this question, at which point decision 760 branches to the 'no' branch exiting the loop.

The process determines whether there are more questions for the selected type of question that are being included on the test (decision 770). If there are more questions for the selected type of question, then decision 770 branches to the 'yes' branch which loops back to step 730 to formulate the next question for the selected type of question. This looping continues until no more questions are being formulated for the selected type of question, at which point decision 770 branches to the 'no' branch exiting the loop. The process determines whether there are more types of questions that are being asked on the test for the selected characteristic (decision 780). If there are more types of questions that are being asked on the test for the selected characteristic, then decision 780 branches to the 'yes' branch which loops back to step 720 to select the next type of question. This looping continues until there are no more types of questions that are being asked for the selected characteristic, at which point decision 780 branches to the 'no' branch exiting the loop.

The process determines whether there are more key characteristics to process from memory area 460 (decision 790). If there are more key characteristics to process, then decision 790 branches to the 'yes' branch which loops back to step 710 to select the next key characteristic from memory area 460. This looping continues until there are no more key characteristics to process, at which point decision 790 branches to the 'no' branch exiting the loop. FIG. 7 processing thereafter returns to the calling routine (see FIG. 4) at 795.

FIG. 8 is an exemplary flowchart that tests knowledge of a system using a generated multiple choice test. FIG. 8 processing commences at 800 and shows the steps taken by a process that tests knowledge of a question answering (QA) system using the generated multiple choice test. At step 805, the process selects the first question from the generated multiple choice test. The multiple choice questions, answers, candidate answers, and reasoning text are retrieved from data store 360. At step 810, the process submits the selected question to system being tested 815 For example, the system under test might be a QA system, a domain-based intelligence system, etc. At step 820, the process receives the answer and the candidate answers along with confidence scores from system being tested 815.

The process determines as to whether the system being tested responded with the correct answer (decision 825). If the system being tested responded with the correct answer, then decision 825 branches to the 'yes' branch to perform step 830. On the other hand, if the system being tested did not respond with the correct answer, then decision 825 branches to the 'no' branch whereupon steps 840 through 860 are performed. At step 830, the process raises the score of the system being tested to reflect the correct response that was provided by the system. The system's overall test score is stored in memory area 835.

Following the 'no' branch from decision 825, the process next determines as to whether the answer provided by the system being tested matches one of the candidate answers with the candidate answers being designed to be deliberately misleading (decision 840). If the answer provided by the system being tested matches one of the candidate answers, then decision 840 branches to the 'yes' branch to perform step 845. On the other hand, if not answer matches one of candidate answers, then decision 840 branches to the 'no' branch bypassing step 845. At step 845, the process analyzes why the system being tested chose one of the misleading candidate answers as the correct answer in order to improve the system that is being tested. The results from the analysis are stored in memory area 850. At step 860, the process lowers the score of the system being tested to reflect the incorrect response that was provided by the system. The system's overall test score is stored in memory area 835.

At step 870, the process compares the candidate answers generated by the system being tested (with confidence scores) to the candidate answers included in the multiple choice test. Data resulting from the comparison is stored in memory area 875. At step 880, the process analyzes the comparison data stored in memory area 875 when the candidate answer(s) provided by the system being tested do not align with the candidate answers from the multiple choice test. The results from the analysis are stored in memory area 850. The process determines whether more questions are included in the multiple choice test (decision 890). If more questions are included in the multiple choice test, then decision 890 branches to the 'yes' branch which loops back to step 805 to select and process the next question from the multiple choice test as described above. This looping continues until there are no more questions in the multiple choice test, at which point decision 890 branches to the 'no' branch exiting the loop. FIG. 8 processing thereafter returns to the calling routine (see FIG. 3) at 895.

Figure 9:
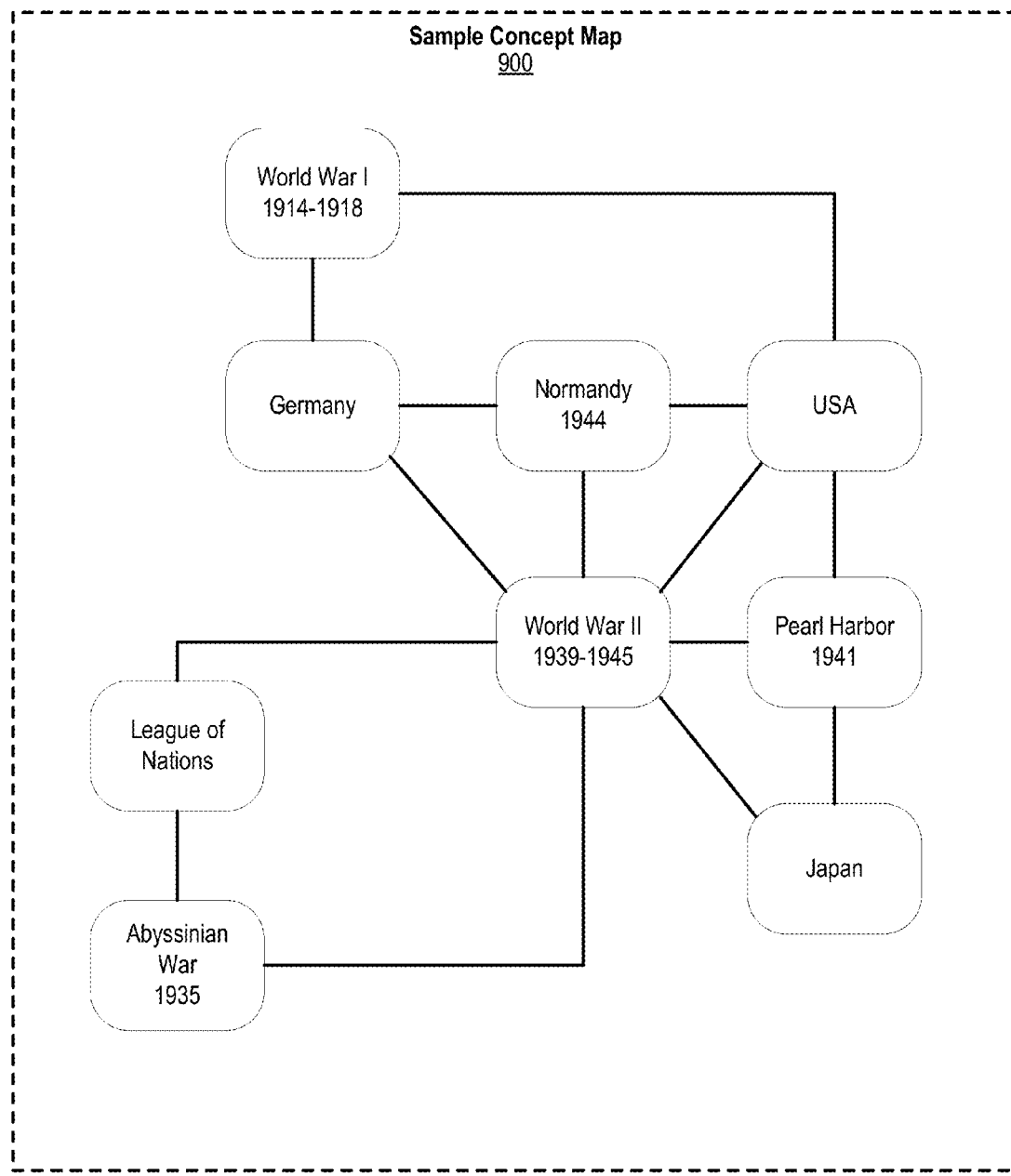
FIG. 9 is a sample concept map that might be utilized by the system when generating a multiple choice test.

FIG. 9 is a sample concept map that might be utilized by the system when generating a multiple choice test. Example concept map 900 shows interaction between various concepts from a question topic of World War II. As shown, the concept of World War II is associated with various countries and battles as well as the League of Nations, the Abyssinian War, and World War I. Questions can be generated using the concept map with candidate answers also being derived from the concept map. For example, using the concept map, a question could be formulated as "What battle preceded entry of USA into World War II?" with the correct answer being "Pearl Harbor" and a candidate answer being "Normandy."

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, that improves a question answering (QA) computer system, the method comprising:

ingesting a set of documents into a first corpus of a first QA computer system;

generating a multiple choice test from the set of documents ingested into the first corpus, wherein the multiple choice test includes a plurality of questions, with each of the questions having a set of candidate answers that includes one correct answer and one or more incorrect candidate answers, wherein the questions and answers are retrieved from the set of documents;

identifying one or more concepts corresponding to each of the questions;

generating the incorrect candidate answers corresponding to each of the questions based on the identified concepts pertaining to the respective questions, wherein the incorrect candidate answers are designed to be misleading in light of the respective questions; and testing a subject using the generated multiple choice test, wherein the subject is a second QA computer system that utilizes a second corpus, with the testing further comprising:

submitting a selected one of the generated questions from the multiple choice test to the second QA computer system;

receiving a responsive answer from the second QA computer system;

comparing the responsive answer to the correct answer and candidate answers corresponding to the selected generated question; and improving an accuracy of the second QA computer system by updating the second corpus with the correct answer to the selected question in response to the comparison revealing that the second QA computer system selected one of the incorrect candidate answers.

2. The method of claim 1 further comprising:

receiving one or more responsive candidate answers from the second QA computer system, wherein each of the responsive candidate answers corresponds to a responsive candidate answer confidence score;

evaluating the received responsive candidate answers based on the generated incorrect candidate answers corresponding to the selected generated question;

in response to the second QA computer system selecting one of the incorrect candidate answers, comparing a set of confidence scores corresponding to the generated incorrect candidate answers and the responsive candidate answer scores; and further improving the accuracy of the second QA computer system by further updating the second corpus by adjusting one or more of the confidence scores corresponding to the incorrect candidate answers.

3. The method of claim 1 further comprising:

generating one or more sets of entity choices based on the identified concepts, wherein at least one of the sets of entity choices is selected from the group consisting of an antonym based set, a personal relationships set, a similarity based set, and an ontology set; and formulating the questions, the correct answers, and the candidate answers from the generated sets of entity choices.

4. The method of claim 1 further comprising:

identifying one or more lexical answer types (LATs) corresponding to the generated questions and correct answers;

generating a plurality of entities based on the LAT by utilizing an entity-relationship map that includes one or more relationship types and one or more object types;

identifying a set of one or more key characteristics of the generated questions based on one or more interactions between a primary entity and the LAT; and selecting a plurality of question types to include in the multiple choice test based on the identified set of key characteristics.

5. The method of claim 4 further comprising:

formulating the generated questions and corresponding correct answers based on matching the selected question types to a concept;

retrieving a set of supporting text corresponding to each formulated correct answer; and including the supporting text in the generated multiple choice test.

6. The method of claim 5 further comprising:

matching the selected question types to an incorrect entity;

formulate the candidate answers based on the matched incorrect entity;

retrieving a set textual incorrect answer reasons corresponding to each of the candidate answers; and including the set textual incorrect answer reasons in the generated multiple choice test.

7. An information handling system comprising:

one or more processors;

one or more data stores accessible by at least one of the processors;

a memory coupled to at least one of the processors; and a set of computer program instructions stored in the memory and executed by at least one of the processors in order to improve a question answering (QA) computer system by performing actions of:

ingesting a set of documents into a first corpus of a first QA computer system;

generating a multiple choice test from the set of documents ingested into the first corpus, wherein the multiple choice test includes a plurality of questions, with each of the questions having a set of candidate answers that includes one correct answer and one or more incorrect candidate answers, wherein the questions and answers are retrieved from the set of documents;

identifying one or more concepts corresponding to each of the questions;

generating the incorrect candidate answers corresponding to each of the questions based on the identified concepts pertaining to the respective questions, wherein the incorrect candidate answers are designed to be misleading in light of the respective questions; and testing a subject using the generated multiple choice test, wherein the subject is a second QA computer system that utilizes a second corpus, with the testing further comprising:

submitting a selected one of the generated questions from the multiple choice test to the second QA computer system;

receiving a responsive answer from the second QA computer system;

comparing the responsive answer to the correct answer and candidate answers corresponding to the selected generated question; and improving an accuracy of the second QA computer system by updating the second corpus with the correct answer to the selected question in response to the comparison revealing that the second QA computer system selected one of the incorrect candidate answers.

8. The information handling system of claim 7 further comprising:

receiving one or more responsive candidate answers from the second QA computer system, wherein each of the responsive candidate answers corresponds to a responsive candidate answer confidence score;

evaluating the received responsive candidate answers based on the generated incorrect candidate answers corresponding to the selected generated question;

in response to the second QA computer system selecting one of the incorrect candidate answers, comparing a set of confidence scores corresponding to the generated incorrect candidate answers and the responsive candidate answer scores; and further improving the accuracy of the second QA computer system by further updating the second corpus by adjusting one or more of the confidence scores corresponding to the incorrect candidate answers.

9. The information handling system of claim 7 further comprising:

generating one or more sets of entity choices based on the identified concepts, wherein at least one of the sets of entity choices is selected from the group consisting of an antonym based set, a personal relationships set, a similarity based set, and an ontology set; and formulating the questions, the correct answers, and the candidate answers from the generated sets of entity choices.

10. The information handling system of claim 7 further comprising:

identifying one or more lexical answer types (LATs) corresponding to the generated questions and correct answers;

generating a plurality of entities based on the LAT by utilizing an entity-relationship map that includes one or more relationship types and one or more object types;

identifying a set of one or more key characteristics of the generated questions based on one or more interactions between a primary entity and the LAT; and selecting a plurality of question types to include in the multiple choice test based on the identified set of key characteristics.

11. The information handling system of claim 10 further comprising:

formulating the generated questions and corresponding correct answers based on matching the selected question types to a concept;

retrieving a set of supporting text corresponding to each formulated correct answer; and including the supporting text in the generated multiple choice test.

12. The information handling system of claim 11 further comprising:

matching the selected question types to an incorrect entity;

formulate the candidate answers based on the matched incorrect entity;

retrieving a set textual incorrect answer reasons corresponding to each of the candidate answers; and including the set textual incorrect answer reasons in the generated multiple choice test.

13. A computer program product stored in a computer readable storage medium device, comprising computer program code that, when executed by an information handling system, causes the information handling system to improve a question answering (QA) computer system by performing actions comprising:

ingesting a set of documents into a first corpus of a first QA computer system;

generating a multiple choice test from the set of documents ingested into the first corpus, wherein the multiple choice test includes a plurality of questions, with each of the questions having a set of candidate answers that includes one correct answer and one or more incorrect candidate answers, wherein the questions and answers are retrieved from the set of documents;

identifying one or more concepts corresponding to each of the questions;

generating the incorrect candidate answers corresponding to each of the questions based on the identified concepts pertaining to the respective questions, wherein the incorrect candidate answers are designed to be misleading in light of the respective questions; and testing a subject using the generated multiple choice test, wherein the subject is a second QA computer system that utilizes a second corpus, with the testing further comprising:

submitting a selected one of the generated questions from the multiple choice test to the second QA computer system;

receiving a responsive answer from the second QA computer system;

comparing the responsive answer to the correct answer and candidate answers corresponding to the selected generated question; and improving an accuracy of the second QA computer system by updating the second corpus with the correct answer to the selected question in response to the comparison revealing that the second QA computer system selected one of the incorrect candidate answers.

14. The computer program product of claim 13, further comprising:

receiving one or more responsive candidate answers from the second QA computer system, wherein each of the responsive candidate answers corresponds to a responsive candidate answer confidence score;

evaluating the received responsive candidate answers based on the generated incorrect candidate answers corresponding to the selected generated question;

in response to the second QA computer system selecting one of the incorrect candidate answers, comparing a set of confidence scores corresponding to the generated incorrect candidate answers and the responsive candidate answer scores; and further improving the accuracy of the second QA computer system by further updating the second corpus by adjusting one or more of the confidence scores corresponding to the incorrect candidate answers.

15. The computer program product of claim 13 further comprising:

generating one or more sets of entity choices based on the identified concepts, wherein at least one of the sets of entity choices is selected from the group consisting of an antonym based set, a personal relationships set, a similarity based set, and an ontology set; and formulating the questions, the correct answers, and the candidate answers from the generated sets of entity choices.

16. The computer program product of claim 13 further comprising:

identifying one or more lexical answer types (LATs) corresponding to the generated questions and correct answers;

generating a plurality of entities based on the LAT by utilizing an entity-relationship map that includes one or more relationship types and one or more object types;

identifying a set of one or more key characteristics of the generated questions based on one or more interactions between a primary entity and the LAT; and selecting a plurality of question types to include in the multiple choice test based on the identified set of key characteristics.

17. The computer program product of claim 16 further comprising:

formulating the generated questions and corresponding correct answers based on matching the selected question types to a concept;
retrieving a set of supporting text corresponding to each formulated correct answer;
including the supporting text in the generated multiple choice test;
matching the selected question types to an incorrect entity;
formulate the candidate answers based on the matched incorrect entity;
retrieving a set textual incorrect answer reasons corresponding to each of the candidate answers; and
including the set textual incorrect answer reasons in the generated multiple choice test.

* * * * *